United States Patent Office 3,418,904
Patented Dec. 31, 1968

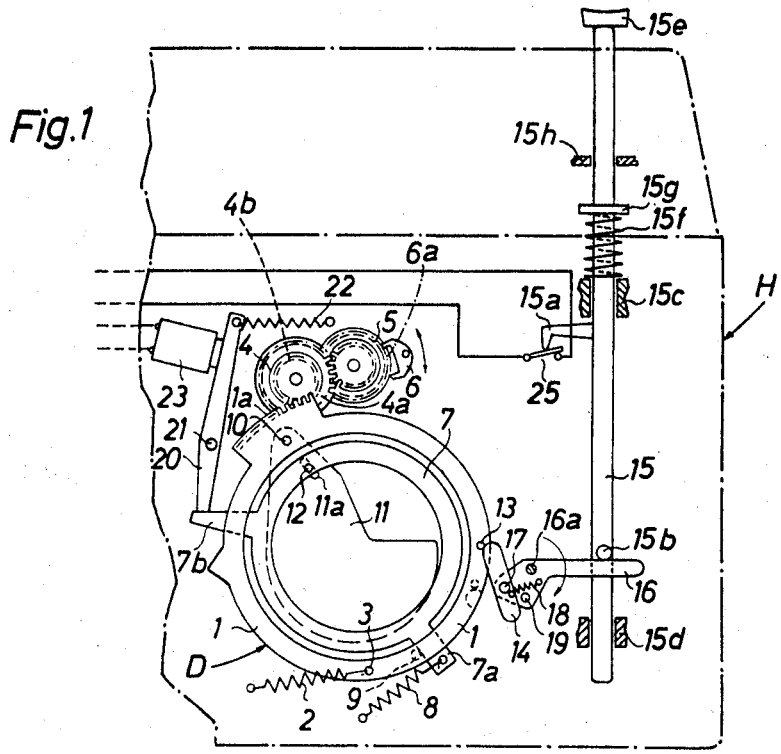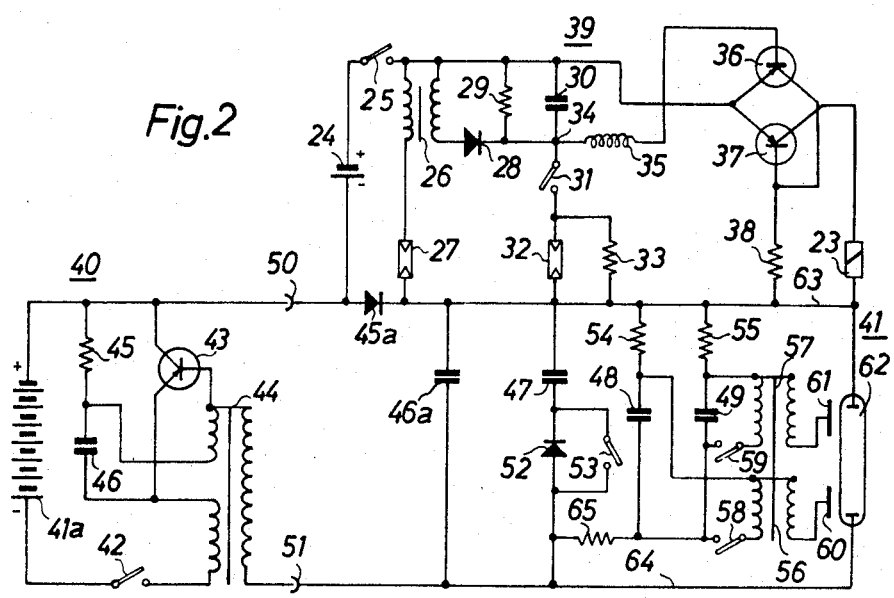

3,418,904
PHOTOGRAPHIC CAMERA WITH AUTOMATIC ELECTRONIC FLASH AND DAYLIGHT DIAPHRAGM CONTROL
Richard Wick, Grunwald, near Munich, Friedrich Biedermann, Unterhaching, Munich, Alfred Winkler, Munich, Friedrich Bestenreiner, Grunwald, near Munich, Gerd Kiper, Unterhaching, Munich, Guenter Pawlik, Munich, Reinhard von Sybel, Krailling, Erwin von Wasielewski, Munich, and Karl Wagner, Ottobrunn, Germany, assignors to Agfa-Gevaert Aktiengesellschaft, Leverkusen, Germany
Filed July 5, 1966, Ser. No. 562,664
Claims priority, application Germany, July 10, 1965, A 49,710
27 Claims. (Cl. 95—10)

The present invention relates to photographic cameras in general, and more particularly to photographic cameras which can be utilized with electronic flash units. Still more particularly, the invention relates to a novel electric circuit which can select the size of the diaphragm aperture in a photographic camera in such a way that the size of the aperture is a function of several factors, especially the intensity of light emanating from one or more sources other than the electronic flash unit as well as such light which is produced by an electronic flash.

A serious drawback of presently known photographic cameras is that, when used with an electronic flash unit, the duration of flash is much too short to allow for automatic selection of the size of the diaphragm aperture and for automatic selection of the exposure time. This holds especially true when the electronic flash unit is one which produces a flash of very short duration. Therefore, the diaphragms of such conventional cameras must be adjusted in advance whereby the adjustment may but need not always be satisfactory, especially since it does not take into consideration the intensity of light coming from one or more sources other than an electronic flash unit.

Accordingly, it is an important object of the present invention to provide a photographic camera which can be used with or without electronic flash units and whose exposure control is constructed and assembled in such a way that the size of the automatically selected diaphragm aperture at the moment when the electronic flash unit produces a flash invariably reflects, with utmost accuracy, the intensity of all such light which reaches the subject in the course of an exposure.

Another object of the invention is to provide a camera of the just outlined characteristics which can be utilized with different types of electronic flash units and which may be provided with built-in or separable electronic flash units.

A further object of the invention is to provide a still camera or a movie camera of the above outlined characteristics wherein the diaphragm and the shutter may but need not be combined into an integral unit and wherein the discharge of the flash can take place in the course of or subsequent to operation of the mechanism which selects the aperture.

A concomitant object of the invention is to provide a novel electric circuit for a camera and to incorporate in such circuit a noval flash circuit which can produce a plurality of flashes for a single exposure.

Briefly stated, one feature of our invention resides in the provision of a photographic camera having a photoelectrically controlled diaphragm whose aperture may be adjusted between a minimum and a maximum size. The camera is further combined or provided with an electronic flash unit which can produce a preliminary flash and a full flash. The light produced by the preliminary flash is reflected from the subject and impinges upon the light-sensitive surface of a transducer in the circuit of the exposure control which selects the size of the aperture. This exposure control then determines the size of the diaphragm aperture during discharge of the main flash.

The exact moment of discharge of the main flash is determined by the exposure control. Such mode of operation is especially advantageous when the size of the diaphragm aperture varies continuously and gradually so that, by discharging the main flash with a predetermined delay following movement of the aperture selecting means from one to the other end position, the main flash will be discharged when the size of the aperture assumes a predetermined value for a given exposure.

Alternatively, the exposure control can arrest the aperture selecting means of the diaphragm. The discharge of the main flash then takes place with a predetermined constant delay following discharge of the preliminary flash. This is possible because the aperture selecting mechanism is arrested and the size of the aperture remains unchanged subsequent to discharge of the preliminary flash and during discharge of the main flash.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary front elevational view of a still camera which comprises a diaphragm which also functions as a shutter, the camera being constructed in accordance with a first embodiment of our invention;

FIG. 2 illustrates the electric circuit of the camera;

Figure 3:
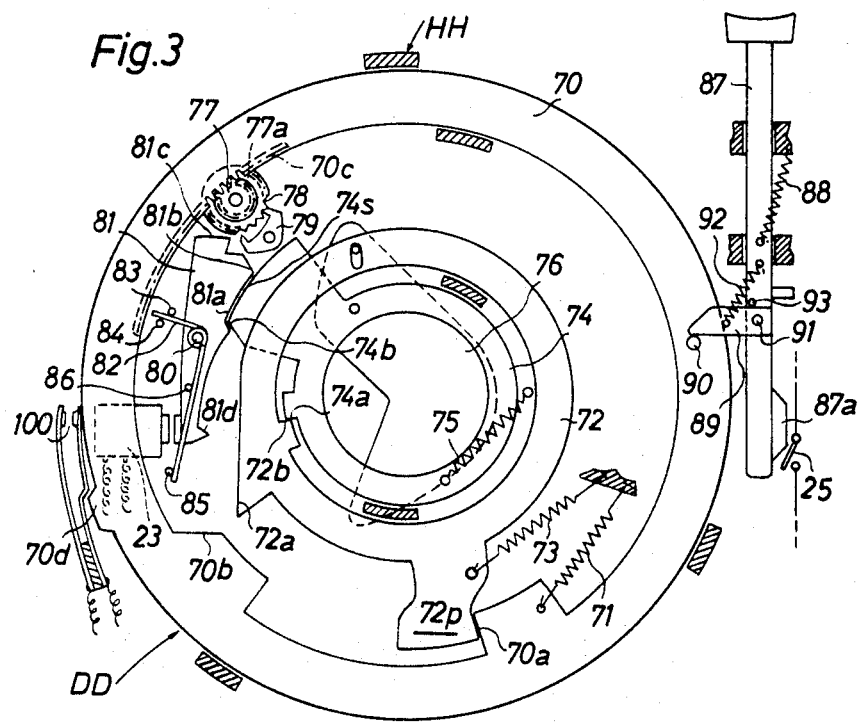
FIG. 3 is a fragmentary front elevational view of a second still camera having a modified diaphragm.

Referring first to FIG. 1, there is shown a still camera which comprises a housing H supporting a combined shutter and diaphragm D which includes two rotary setting members or rings 1 and 7. The ring 1 is the leading ring and is biased by a helical return spring 2 which tends to rotate it in a clockwise direction as the parts appear in FIG. 1. The trailing ring 7 is concentric with the leading ring 1 and is biased by a second return spring 8 tending to rotate it in a clockwise direction. The leading ring 1 carries a motion transmitting pin 9 which normally abuts against a projection or lug 7a of the trailing ring 7 so that, when the ring 1 is cocked by a cocking lever 14, it entrains the trailing ring 7 against the action of the return spring 8. FIG. 1 shows the rings 1 and 7 in fully cocked positions. A suitable stop, not shown, arrests the leading ring 1 in uncocked position. The return spring 2 operates between the housing H and a pin 3 of the leading ring 1. The other return spring 8 operates between the lug 7a and the housing H.

The leading ring 1 carries a plurality of pivot pins 10 (only one shown) each of which supports a blade 11. Each such blade 11 is formed with an elongated cam slot 11a for a follower pin 12 affixed to the trailing ring 7. The blades 11 can define a diaphragm aperture whose size increases gradually when the leading ring 1 rotatoes with reference to the trailing ring 7 under the bias of the return spring 2. When the lug 7a abuts against the pin 9, the size of the aperture is reduced to zero.

The camera shown in FIG. 1 further comprises a retarding mechanism for the leading ring 1. This retarding mechanism comprises a gear segment 1a on the leading ring 1, a gear 4 which meshes with the segment 1a, a second gear 4a which is coaxial with the gear 4, a one-way clutch 4b which connects the gear 4 with the gear 4a, a further gear 5 which meshes with the gear 4a, an escapement wheel 6a which is rigid with the gear 5, and an escapement anchor 6 which cooperates with the wheel 6a, in a well known manner so that, when the leading ring 1 is fully cocked and is thereupon released to rotate in a clockwise direction under the action of the return spring 2, it clockwise movement takes place at the speed determined by the retarding mechanism. The one-way clutch 4b allows the leading ring 1 to move freely to its cocked position, i.e., the gear 4 is free to rotate with reference to the gear 4a in a counterclockwise direction.

The aforementioned cocking lever 14 cooperates with a cocking pin 13 on the leading ring 1 and is rockable on a pivot pin 17 provided on a second lever 16 which is rockable on a fixed pivot pin 16a. A helical spring 18 tends to maintain one arm of the cocking lever 14 in abutment with a stop pin 19 of the lever 16. One arm of the lever 16 extends into the pathway of a motion transmitting pin 15b on a reciprocable trigger 15. This trigger is guided by bearings 15c, 15d of the housing H and has a head 15e which extends from the housing and may be depressed by hand against the action of a return spring 15f operating between the bearing 15c and a collar 15g. When the spring 15f is free to expand, the collar 15g, abuts against a fixed stop 15h. When the trigger 15 is depressed by hand, the pin 15b rocks the lever 16 in a clockwise direction and the lever 16 entrains the cooking lever 14 so that the latter moves the pin 13 from the broken-line position 13′ to the solid-line position of FIG. 1. The leading ring 1 is then fully cocked and the return spring 2 stores energy. Further depression of the trigger 15 causes the cocking lever 14 to bypass the pin 13 whereby the leading ring 1 starts to rotate in a clockwise direction at the speed determined by the retarding mechanism including the segment 1a and gear 4. The trailing ring 7 is cocked with the leading ring 1 because the latter's pin 9 entrains the lug 7a.

The trailing ring 7 is provided with a second projection or lug 7b which cooperates with a blocking lever 20 rockable on a fixed pin 21. The lever 20 is permanently biased by a spring 22 and constitutes the movable armature of an electromagnet 23 which in turn forms part of a switching unit serving to effect closing of the diaphragm D. When the electromagnet 23 is energized, it overcomes the bias of the spring 22 and the blocking lever 20 assumes the position which is shown in FIG. 1 whereby one of its arms holds the trailing ring 7 against clockwise rotation.

The trigger 15 can close a series of switches which are connected in the electric circuit of the camera. FIG. 1 merely shows one such switch 25 which can be closed by a trip 15a carried by the trigger 15.

The operation of the diaphragm D is as follows: When the trigger 15 is depressed to the position shown in FIG. 1, it first closes the switch 25 (trip 15a) and its pin 15b rocks the lever 16 to thereby cock the leading ring 1 through the intermediary of the cocking lever 14 and pin 13. The trailing ring 7 is cocked with the leading ring 1 through the pin 9 and lug 7a. When the trailing ring 7 is fully cocked, its lug 7b is engaged and retained by the blocking lever 20 as long as the electromagnet 23 remains energized. The ring 1 follows the bias of the spring 2 and rotates in a clockwise direction at the speed determined by the retarding mechanism 1a, 4, 4a, 4b, 5, 6, 6a. The blades 11 then define an aperture whose size increases proportionally with increasing angular displacement of the leading ring 1 with reference to the trailing ring 7. The electromagnet 23 is deenergized with a predetermined delay following clockwise movement of the leading ring 1. The trailing ring 7 is not connected with a retarding mechanism and is free to follow the bias of the spring 8 as soon as its lug 7b is released by the blocking lever 20. Thus, rotation of the trailing ring 7 is much more rapid than that of the leading ring 1 and the aperture of the diaphragm 4 is reduced to zero when the lug 7a reaches the pin 9. From then on, the rings 1 and 7 rotate as a unit until they return to their respective uncocked positions (see the broken-line position 13′ of the cocking pin 13). The extent of delay with which the electromagnet 23 releases the trailing ring 7 depends on the intensity of prevailing light and also on other factors which will be described in connection with FIG. 2.

The diagram of FIG. 2 illustrates a circuit 39 of the exposure control, a flash voltage supply circuit 40, and a flash circuit 41. In the circuit 39, the switch 25 is connected to the positive terminal of a source of electrical energy here shown as a battery 24. The switch 25 is closed by the trip 15a of the trigger 15 when the latter begins to leave its idle position. The battery 24 is connected in parallel with the primary winding of a transformer 26 and with a transducer, preferably a light-sensitive resistor element 27. The resistor element 27 is preferably a cadmium sulfide cell. The secondary winding of the transformer 26 is connected in series with a diode 28 and this series combination is in turn connected in parallel with a resistor 29 of relatively high ohmic value. The resistor 29 is connected in parallel with and controls the discharge of a capacitor 30. A switch 31 is connected between the capacitor 30 and a second light-sensitive resistor 32. The switch 31 is closed by the leading ring 1 when the latter is free to follow the bias of the return spring 2 or by the cocking lever 14 when the latter moves beyond the cocking pin 13. The resistor element 32 is connected in parallel with a resistor 33. One terminal of each of the resistors 32, 33 is connected to the negative pole of the battery 24. An inductance 35 is connected to a junction 34 between the capacitor 30 and switch 31 and to the base of a first transistor 36. The transistor 36 forms with a second transistor 37 part of the aforementioned switching unit. The emitters of the transistors 36, 37 are connected to the positive terminal of the battery 24. The collector of the transistor 36 is connected to the base of the transistor 37 and the collector of the transistor 37 is connected to the coil of the electromagnet 23. The base of the transistor 37 is connected to the negative terminal of the battery 24 by way of a resistor 38.

The flash voltage supply circuit 40 for the flash circuit 41 includes a separate source of electrical energy here shown as a battery 41a. The positive terminal of this battery 41a is connected to the negative terminal of the battery 24. In the circuit of the battery 41a is connected a switch 42 which must be closed to place the flash circuit 41 in operative condition. As commonly known, charging of the flash capacitor or capacitors consumes a definite amount of time and, therefore, the switch 42 cannot be coupled to the means for closing the diaphragm D. Connected to the positive terminal of the battery 41a is the collector of a transistor 43. The base of the transistor 43 is connected to one of two primary windings of a transformer 44. This particular winding serves as a control winding of the transformer 44. The other primary winding of the transformer 44 is connected between the emitter of the transistor 43 and the negative terminal of the battery 41a.

A resistor 45 and a capacitor 46 are shown diagrammatically to be connected in parallel with the emitter-collector circuit of the transistor 43. The junction connecting the resistor 45 to the capacitor 46 is connected to the control winding of the transformer 44. The resulting oscillations of the collector are amplified by the transformer 44 and such oscillations are rectified by a diode 45a. The resultant rectified voltage is transmitted to charging capacitors 46a, 47, 48 and 49. The voltage supply circuit 40 may be made separable from the flash circuit 41 through the application of connectors 50 and 51. Connected in series with the capacitor 47 is a diode 52 which allows the charging of the capacitor but inhibits the discharge of the capacitor 47 into the flash bulb 62.

The diode 52 can be shorted by a parallel connected switch 53. In line with the capacitor 48 and 49 are charging resistors 54 and 55, respectively. The junctions between these capacitors and resistors are in turn connected to the ignition coils 56 and 57, respectively. By means of the switches 58 and 59, the primary windings of these ignition coils are connected to the secondary of the transformer 44 by way of a resistor 65. Connected to the secondary windings of the ignition coils 56, 57 are ignition electrodes 60 and 61 of the flash bulb 62. The terminals of the flash bulb 62 are connected in a well-known manner to the terminals of the capacitors 46a, 47, 48, 49 by way of leads 63 and 64. The resistor 65 is connected in series with the capacitors 48 and 49 serves as a current limiting resistor.

The operation is as follows:

To make the exposure with flash, the switch 42 is closed so that, upon elapse of a predetermined interval, the capacitors 46a, 47 reach their operating potential. In response to depression of the trigger 15, the leading ring 1 is rotated against the action of the spring 2 and at the same time the switch 25 is closed by the trip 15a. As a result, the circuit 39 is rendered operative and the potential of the battery 24 is applied to the emitters of the transistors 36 and 37. Since the base of the transistor 36 is at the same potential, the transistor 36 is cut off. The base of the transistor 37 is connected to the negative terminal of the battery 24 by way of the resistor 38; therefore, the transistor 37 conducts and the electromagnet 23 is energized through the emitter-collector circuit of the transistor 37. In response to further depression of the trigger 15, the switch 59 in the flash circuit 41 becomes closed. As a result, the capacitor 49 discharges across the primary winding of the ignition coil 57. The secondary winding of the ignition coil 57 then applies high voltage to the ignition electrode 61. The flash bulb 62 is ignited and the capacitor 46a applies the electrical energy therefor. The discharge of the capacitor 47 is inhibited by the diode 52. This preliminary illumination of the subject produces a current of short duration through the resistor element 27. The latter causes a current of short duration to flow in the primary coil of the transformer 26. As a result, a similar current flows in the secondary coil of the transformer 26 and is applied to the capacitor 30 by way of the diode 28 and is stored in that capacitor. The ohmic resistance of the resistor 29 is so high that it can change the condition of the capacitor 30 only after a relatively long period of time. Thus, when the circuit 39 is rendered operative, the resistor 29 maintains the capacitor 30 in a neutral non-charged condition. During the rapidly occurring uncocking of the ring 7, the effect of the resistor 29 on the capacitor 30 is negligible. The inductance 35 serves to inhibit the triggering of the switching unit including the transistors 36, 37 before the capacitor 30 is charged to a predetermined potential.

Through further depression of the trigger 15, the blocking lever 20 drops behind the projection 7b of the ring 7 due to the effect of the electromagnet 23. The cocking lever 14 has advanced beyond the cocking pin 13. At the same time, the switch 31 is closed, for example, by the released leading ring 1, by the cocking lever 14 or by the lever 16. The ring 1 now turns in a clockwise direction in response to the bias of the spring 2 and the diaphragm begins to open slowly. Through the closing of the switch 31, the capacitor 30 is further charged by way of the resistor element 32. Depending on the intensity of light produced by the preliminary flash, the junction 34 reaches sooner or later the critical potential for the switching unit. As the same time, the intensity of the prevailing light is taken into account by the resistor element 32. On the other hand, the resistor 33 supplies to the capacitor 30 such portion of the charge which corresponds to the opening of the diaphragm to account for light supplied by the flash bulb 62 so that, even in complete darkness, proper diaphragm aperture is selected for the flash exposure. If now the junction 34 and hence the base of transistor 36 have reached the critical potential, i.e., the base is sufficiently negative in comparison with the emitter so that the emitter-collector circuit conducts more current than that through the resistor 38, the base of the transistor 37 assumes the potential of the positive terminal of the battery 24. As a result, the transistor 37 is cut off and the electromagnet 23 is deenergized. The blocking lever 20 under the influence of the spring 22 releases the projection 7a and the tailing ring 7 follows the leading ring 1. The ring 7 overtakes the ring 1 very rapidly and accordingly the diaphragm becomes closed. On deenergization of the electromagnet 23, the switches 53 and 58 are closed so that the main charge stored in the capacitor 47 is released into the flash bulb 62 in the commonly known manner. Since the ignition of the main flash is much more rapid than the closing of the diaphragm, the size of the aperture assumes its maximum permissible value during the flash. With the return of the release mechanism to its initial position, the switches (with the excepton of switch 42) return to the positions indicated in FIG. 2 so that after a period of time corresponding to the charging of the flash capacitors the next exposure can be made.

It will be seen that the diaphragm D can be controlled by the retarding mechanism in such a way that the size of the aperture increases gradually, as soon as the leading ring 1 is fully cocked. The aperture is closed when the electromagnet 23 allows the spring 22 to disengage the blocking lever 20 from the trailing ring 7. The electromagnet 23 then also causes discharge of the main flash.

The first resistor element 27 allows for charging of the capacitor 30 during discharge of the preliminary flash. The second resistor element 32 allows for charging of the capacitor 30 as a function of the intensity of light other than that produced by the preliminary flash. The resistor 29 insures that the capacitor 30 assumes a predetermined condition when the exposure begins and its relatively high ohmic resistance cannot cause any appreciable distortions of measurements.

The switch 31 closes automatically when the leading ring 1 begins to return to uncocked position. Thus, charging of the capacitor 30 through the resistor element 32 and resistor 33 begins when the exposure control starts to open the diaphragm. The length of the interval during which the leading ring 1 can move with reference to the blocked trailing ring 7 depends on the intensity of light produced by the flash and on the intensity of light other than that produced by the flash.

The provision of the aforedescribed switching unit including the electromagnet 23 with blocking lever 20 and spring 22, transistor 36, and transistor 37 is of particular advantage in a camera having a diaphragm of the type shown in FIG. 1 because this switching unit can react instantaneously so that the interval between the discharge of the preliminary flash and the discharge of the main flash can be very short.

The inductance 35 prevents direct transmission of impulses produced by the first resistor element 27 through the transformer 26 and on to the base of the transistor 36. Such directly transmitted impulses could cause the switching unit to produce a signal before the capacitor 30 is charged to critical potential.

The transistor 43 performs the function of a chopper and the diode 52 prevents discharge of the capacitor 47 during discharge of the preliminary flash. Thus, the switch 53 must be closed in response to deenergization of the electromagnet 23 so that the circuit 41 is then ready to produce the main flash. On the other hand, the diode 52 cannot prevent charging of the capacitor 47.

FIG. 3 illustrates a portion of a modified still camera. This camera comprises a different diaphragm DD whose opening diagram is not a true triangle, as that of the diaphragm D shown in FIG. 1, but resembles a trapezium. This is achieved by the provision of a projection or stop 70a which is placed in requisite position with reference to the leading setting ring 72 prior to opening of the diaphragm so that the leading ring 72 can rotate into abutment with such stop without being subjected to a retarding action. The ring 72 then remains in abutment with the stop until the trailing setting ring 74 returns to uncocked position.

The exact construction of the diaphragm DD is as follows:

An auxiliary setting member or ring 70 is rotatable in the housing HH of the camera and is biased by a return spring 71 which tends to rotate it in a counterclockwise direction, as viewed in FIG. 3. The auxiliary setting ring 70 carries the projection or stop 70a which normally abuts against a projection 72p of the leading ring 72. The latter is biased by a helical return spring 73 which tends to rotate it in a counterclockwise direction and to maintain it in abutment with the stop 70a. The trailing setting ring 74 is concentric with the leading ring 72 and is biased by a return spring 75 which is fastened to the ring 72 so that the ring 74 also tends to rotate in a counterclockwise direction. The blades 76 (only one shown) are coupled to the setting rings 72, 74 in the same way as described in connection with FIG. 1 and will define between themselves a diaphragm aperture of gradually increasing size when the leading ring 72 rotates with reference to the trailing ring 74. When the diaphragm DD is closed, a projection 72b of the leading ring 72 abuts against the projection 74a of the trailing ring 74.

The auxiliary setting ring 70 is formed with an internal gear segment 70c which forms part of a retarding mechanism and meshes with a gear 77. The gear 77 is coaxial with an escapement wheel 78 which cooperates with an escapement anchor 79. The operative connection between gear 77 and escapement wheel 78 comprises a one-way clutch 77a.

The housing HH carries a fixed pivot pin 80 for a two-armed blocking lever 81 which constitutes the armature of the electromagnet 23. The spring 22 of FIG. 1 is replaced by a torsion spring 82 which is convoluted around the pin 80 and one leg of which is received between two stationary pins or studs 83, 84. The other leg of the spring 82 normally bears against a third fixed stud 85 but can be moved away from the stud 85 by a motion transmitting projection or stud 86 on the lower arm of the blocking lever 81 when the latter is rocked in a counterclockwise direction. When the second leg of the torsion spring 82 is moved away from the stud 85, this spring tends to rotate the blocking lever 81 in a clockwise direction. The electromagnet 23 is energizable to attract the lower arm of the blocking lever 81.

When the electromagnet 23 is deenergized, the blocking lever 81 assumes an angular position in which its face 81a abuts against a segmental portion 74s of the trailing setting ring 74. In such position, the blocking lever 81 does not interfere with movement of the escapement anchor 79. When the electromagnet 23 is energized, it causes a shoulder 81b of the blocking lever 81 to abut against the projection 72a of the leading ring 72 to hold this ring against rotation in a counterclockwise direction. At the same time, a further shoulder 81c of the blocking lever 81 extends into the path of movement of the escapement anchor 79 so that the retarding mechanism is ineffective. The blocking lever 81 is also movable to a third angular position in which its hook-shaped arresting portion 81d engages the projection 72a of the leading ring 72. The arresting portion 81d then holds the projection 72a by friction while the escapement anchor 79 is free to oscillate.

The camera of FIG. 3 further comprises a reciprocable trigger 87 which is biased to starting postion by a helical return spring 88. This trigger carries a pivot pin 91 for a cocking lever 89 which can entrain a cocking pin 90 on the auxiliary setting ring 70. A spring 92 urges the cocking lever 89 into abutment with a stop pin 93. A trip 87a of the trigger 87 closes the switch 25 when the trigger is depressed by hand to leave its starting position.

The auxiliary setting ring 70 also carries a trip 70d which can close a switch 100 in response to clockwise rotation into its cocked position. The trip 70d allows the switch 100 to open as soon as the auxiliary ring 70 leaves its cocked position.

Figure 4:
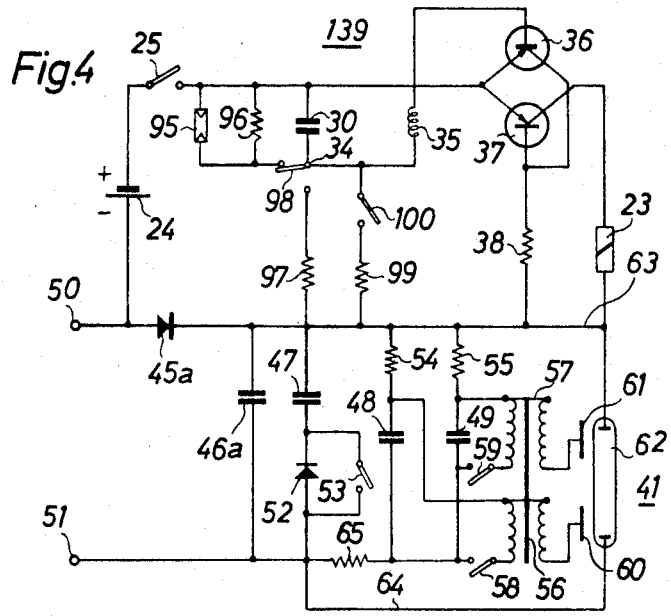
FIG. 4 illustrates the electric circuit of the second camera.

The electric circuit of the camera shown in FIG. 3 is illustrated in FIG. 4. Such components of this circuit whose function is identical with that of the corresponding components shown in FIG. 2 are denoted by similar reference numerals. It will be seen that the two circuits differ mainly in the construction of their respective exposure control circuits 39, 139. The circuit 139 of FIG. 4 includes a light-sensitive resistor element or transducer 95 connected in parallel with a resistor 96 and with the capacitor 30. Connectable in series with the capacitor 30 is another resistor 97. A switch 98 which is operated by the electromagnet 23 can connect the capacitor 30 either with the resistor 97 or with the parallel combination of the light-sensitive resistor element 95 and resistor 96. Connectable in parallel with the resistor 97 is a further resistor 99 of low ohmic resistance. The resistor 99 is connected in series with the aforementioned switch 100.

The operation is as follows:

With the depression of the trigger 87, the three setting rings 70, 72 and 74 are rotated in a clockwise direction against the action of the springs 71, 73 and 75. Shortly before the trigger 87 reaches its final or lowermost position, the switch 25 is closed and this activates the circuit of the exposure control. Since the switch 98 is held in a position in which the resistor element 95 and resistor 96 are connected in parallel with the capacitor 30, the latter is discharged. The switch 100 is closed simultaneously with the switch 25 so that the capacitor 30 becomes rapidly charged by way of the resistor 99 of relatively low ohmic value. The discharge across the resistor element 95 and resistor 96 is so small that the charge of the capacitor 30 is substantially the same as that of the battery 24.

In response to further depression of the trigger 87, the tip of the cocking lever 89 moves beyond the cocking pin 90 so that the auxiliary setting ring 70 is released. Just before such release of the setting ring 70, its cam 70b has rocked the blocking lever 81 in a counterclockwise direction so that the arresting portion 81d abuts against the projection 72a of the leading ring 72. When the auxiliary setting ring 70 then rotates back to uncocked position (spring 71), its movement is retarded by the retarding mechanism including the segment 70c and gear 77 so that such rotation of the auxiilary setting ring takes place at a predetermined speed.

The trip 70d of the auxiliary setting ring 70 then releases the switch 100 so that the latter opens whereby the capacitor 30 discharges across the resistor element 95 and resistor 96. The resistor element 95 takes into consideration the prevailing lighting conditions whereas the resistor 96 takes care of the discharge of the main flash, even at such times when the intensity of surrounding light reaching the resistor element 95 is not sufficient to bring about such charging of the capacitor 30 as is necessary to effect the operation of the switching unit.

If the switch 59 is closed simultaneously with opening of the switch 100, the generation of a preliminary flash takes place in the same way as described in connection with FIG. 2. The amount of light produced by the preliminary flash and reflected from the subject back onto the light-sensitive surface of the resistor element 95 depends on the intensity of the preliminary flash and on the reflection of light in the area where the exposure is to be made. Such reflected light effects discharge of the capacitor 30 whereby the inductance 35 prevents too early operation of the switching unit in response to the impulse-like surge of current flowing through the resistor element 95 on discharge of the preliminary flash.

When the current flowing through the resistor element 95 and resistor 96 causes sufficient charging of the capacitor 30 so that the switching unit can produce an impulse, the electromagent 23 is energized and rocks the blocking lever 81 in a clockwise direction, as viewed in FIG. 3. The projection 72a of the leading ring 72 is then released by the arresting portion 81d of the lever 81. At the same time, the shoulder 81b of the blocking lever 81 extends into the path of the face 74b on the trailing ring 74 so that the latter is held against rotation in a counterclockwise direction. The shoulder 81c blocks the operation of the escapement anchor 79 so that the auxiliary setting ring 70 ceases to rotate.

Energization of the electromagnet 23 also results in movement of the switch 98 to its other position in which the capacitor 30 is connected in series with the resistor 97. The leading ring 72 rotates without interference until its projection 72p reaches the stop 70a of the auxiliary setting ring 70. Thus, the diaphragm remains open for an interval of time whose length is determined by the combination including the capacitor 30 and resistor 97. The resistor 97 can be replaced by a set of resistors one or more of which may be connected in the circuit 139 to thus determine the delay between opening and closing of the diaphragm. Also, and when the camera is to be used without flash, the resistor 97 can be replaced by a light-sensitive resistor element.

When the voltage between the plates of the capacitor 30 rises to such an extent that the potential at the junction 34 exceeds a critical value, the switching unit returns to inoperative position and the electromagnet 23 is deenergized. This results in closing of the switches 53 and 58 so that the circuit of the main or full flash is completed to bring about illumination of the subject. The switch 98 returns to the position of FIG. 4 to effect discharge of the capacitor 30. The face 74b of the trailing ring 74 then rocks the blocking lever 81 against the bias of the torsion spring 82 so that the ring 74 returns to uncocked position and reduces the size of the diaphragm aperture to zero. The movement of the trailing ring 74 to uncocked position is very rapid but is still much too slow to be completed prior to discharge of the main flash. Thus, the main flash is discharged while the size of the diaphragm aperture is still at a maximum value for a given exposure. When the trigger 87 is released, all of the parts automatically return to their starting or idle positions.

The charging and discharging of the capaictor 30 takes much longer than the interval during which the flash illuminates the subject. Therefore, the inductance 35 has no adverse (braking) effect upon the sequence and speed of operations which take place during depression of the trigger 87.

If the prevailing light and/or the light produced by the preliminary flash is so weak that current flowing through the resistor element 95 does not suffice to properly charge the capacitor 30 while the auxiliary setting ring 70 rotates, the resistor 96 insures that the main flash is produced when the size of the diaphragm aperture assumes a maximum possible value, i.e., when the diaphragm is fully open. Thus, exposures made under such circumstances can still yield satisfactory pictures.

In the camera of FIGS. 3 and 4, the electromagnet 23 again functions as a means for releasing the trailing ring 74 and for determining the exact moment of discharge of the main flash.

The circuit 139 of FIG. 4 operates in two cycles and its advantage is seen to reside in that a single light-sensitive resistor element 95 suffices to influence the size of the aperture as a function of the intensity of the preliminary flash and as a function of the intensity of prevailing light other than that produced by the electronic flash unit. The first cycle is completed with energization of the electromagnet 23, and the duration of the second cycle depends on the resistor 97 which determines the exposure time. The electromagnet 23 is deenergized on completion of the second cycle to initiate the discharge of the main flash and closing of the diaphragm DD.

The present invention can also be embodied in cameras wherein the shutter forms a separate component and is provided in addition to a photoelectrically controlled diaphragm. The adjustment of the diaphragm can be carried out as described in connection with the auxiliary setting ring 70 of FIG. 3 and the shutter is then actuated in a well known manner subsequent to proper selection of the aperture. The flash can be discharged during adjustment of the diaphragm or preferably together with actuation of the shutter.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a diaphragm comprising setting means operative to vary the size of the diaphragm aperture between a minimum value and a maximum value; electronic flash means having a first circuit for discharging a preliminary flash and thereupon a main flash; and an exposure control having a second circuit comprising actuating means for transmitting to said first circuit impulses for generation of said preliminary flash, and control means for controlling the operation of said setting means as a function of the intensity of incident light and including light-sensitive transducer means for influencing the size of said aperture as a function of the intensity of light reaching said transducer means in response to discharge of said preliminary flash.

2. A structure as set forth in claim 1, wherein said second circuit comprises means for transmitting to said first circuit impulses for generation of said main flash.

3. A structure as set forth in claim 1, wherein said control means comprises means for arresting said setting means.

4. A structure as set forth in claim 3, wherein said setting means comprises a first, a second and an auxiliary setting member each movable between a first and a second position, cocking means for moving said setting members to second positions, means for permanently biasing said setting members to first positions, and retarding means for determining the speed of movement of said auxiliary setting member to first position, said first setting member being arranged to increase the size of said aperture in response to movement from second position while said second setting member remains in second position, said control means further including a switching unit having electromagnet means for holding said auxiliary setting member against the action of said biasing means and said auxiliary setting member having stop means for holding said first setting member against movement to first position, said electromagnet means being energizable to hold said second setting member in second position.

5. A structure as set forth in claim 4, wherein said first circuit comprises normally open switch means arranged to close in response to deenergization of said electromagnet means and to thereby initiate the discharge of said main flash.

6. A structure as set forth in claim 1, wherein said setting means comprises a leading and a trailing setting member each movable between a first and a second position and wherein said leading member is arranged to increase the size of said aperture in response to movement from second position while said trailing member remains in second position, said diaphragm further comprising biasing means for permanently urging said setting members to first positions and retarding means for regulating the speed of movement of said leading member to first position.

7. A structure as set forth in claim 6, wherein said control means comprises a switching unit including electromagnet means energizable to hold said trailing setting member in second position, said first circuit comprising normally open switch means which, when closed, completes said first circuit for generation of said main flash, said switch means being closed in response to deenergization of said electromagnet means so that the discharge of said main flash takes place simultaneously with release of said trailing setting member to first position to thereby close said diaphragm.

8. A structure as set forth in claim 7, wherein said second circuit further comprises second light-sensitive transducer means, a source of electrical energy and transformer means having a primary winding connected in series with said source and with said first mentioned transducer means.

9. A structure as set forth in claim 8, wherein said first mentioned transducer means is connected in series with said source and in parallel with said second transducer means.

10. A structure as set forth in claim 8, wherein said second circuit further comprises a diode, a capacitor connected in series with said diode and with the secondary winding of said transformer means, and resistor means of high ohmic resistance connected in parallel with said capacitor.

11. A structure as set forth in claim 8, wherein said second circuit further comprises a diode and a capacitor connected in series with said diode and with the secondary winding of said transformer means.

12. A structure as set forth in claim 11, wherein said second transducer means is connected in series with said capacitor and with said source.

13. A structure as set forth in claim 11, wherein said second circuit further comprises resistor means connected in parallel with said second transducer means and normally open switch means connected in series with said second transducer means, said switch means being closed in reponse to movement of said leading setting member to first position so that said capacitor is charged by current flowing through said second transducer means and said resistor means.

14. A structure as set forth in claim 12, wherein said second circuit further comprises resistor means connected in parallel with said second transducer means.

15. A structure as set forth in claim 8, wherein said switching unit further comprises two transistors having emitters connected with the positive pole of said source, said transistors being arranged to determine the condition of said electromagnet means.

16. A structure as set forth in claim 15, wherein the collector of one of said transistors is connected with the base of the other transistor and further comprising resistor means connecting the base of said other transistor with the negative pole of said source.

17. A structure as set forth in claim 16, wherein said electromagnet means is connected between the negative pole of said source and the base of said other transistor.

18. A structure as set forth in claim 12, wherein said switching unit further comprises two transistors for determining the condition of said electromagnet means and said control means further comprises an induction connecting the base of one of said transistors with a junction provided between said capacitor and said second transducer means.

19. A structure as set forth in claim 1, further comprising a third circuit for supplying flash voltage to said first circuit, said third circuit comprising transformer means having two primary windings and a secondary winding, a source of electrical energy connected in circuit with said transformer means, and transistor means having a base connected with one of said primary windings and an emitter connected with the other primary winding, said first circuit comprising charging capacitor means and rectifier means connecting said charging capacitor means in circuit with said secondary winding.

20. A structure as set forth in claim 19, wherein one of said primary windings is connected in series with the emitter-collector stage of said transistor means.

21. A structure as set forth in claim 19, wherein said third circuit further comprises capacitor means connected with the base of said transistor means through said one primary winding.

22. A structure as set forth in claim 19, wherein said charging capacitor means comprises a pair of parallel connected charging capacitors and said first circuit further comprises a diode connected in series with one of said charging capacitors and normally open switch means connected in parallel with said diode.

23. A structure as set forth in claim 1, wherein said first circuit comprises a flash bulb, two ignition electrodes for said flash bulb, two ignition coils each having a primary winding and a secondary winding, each of said secondary windings being connected with one of said electrodes, a charging capacitor connected in series with each of said primary windings, and normally open switch means connected in series between each primary winding and the respective charging capacitor.

24. A structure as set forth in claim 23, wherein said first circuit further comprises resistor means connected in series with each of said charging capacitors.

25. A structure as set forth in claim 24, wherein said second circuit comprises a source of electrical energy, a capacitor connected in circuit with said source, resistor means and second switch means for connecting said resistor means in series with said capacitor in response to energization of said electromagnet means.

26. A structure as set forth in claim 25, wherein said second circuit further comprises second resistor means connected in parallel with said transducer means, said second switch means being arranged to connect said capacitor in parallel with said transducer means and said second resistor means in response to deenergization of said electromagnet means.

27. A structure as set forth in claim 26, wherein said second circuit further comprises third resistor means and third switch means for connecting said third resistor means in parallel with said first mentioned resistor means in response to movement of said auxiliary setting member from second position.

References Cited
UNITED STATES PATENTS
3,308,733   3/1967   Von Albedyll et al. _ _ _ _ 95—10

NORTON ANSHER, *Primary Examiner.*

J. F. PETERS, Jr., *Assistant Examiner.*

U.S. Cl. X.R.

95—11.5, 53, 64